(12) United States Patent
Lee

(10) Patent No.: US 9,264,700 B2
(45) Date of Patent: Feb. 16, 2016

(54) MULTI VIEWER DISPLAY AND DISPLAYING METHOD OF THE SAME

(71) Applicant: SAMSUNG ELECTRONICS CO., LTD., Suwon-si, Gyeonggi-do (KR)

(72) Inventor: Eun-jae Lee, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 342 days.

(21) Appl. No.: 13/891,393

(22) Filed: May 10, 2013

(65) Prior Publication Data

US 2014/0085440 A1 Mar. 27, 2014

(30) Foreign Application Priority Data

Sep. 26, 2012 (KR) .................. 10-2012-0107125

(51) Int. Cl.
*H04N 13/00* (2006.01)
*H04N 13/04* (2006.01)

(52) U.S. Cl.
CPC ....... *H04N 13/0447* (2013.01); *H04N 13/0404* (2013.01); *H04N 13/047* (2013.01); *H04N 2013/0463* (2013.01); *H04N 2013/0465* (2013.01)

(58) Field of Classification Search
CPC .......... H04N 13/0468; H04N 13/0475; H04N 13/0018; H04N 13/0404; H04N 13/0415; H04N 13/047; H04N 13/0477; H04N 13/0484
See application file for complete search history.

(56) References Cited

U.S. PATENT DOCUMENTS

| | | | |
|---|---|---|---|
| 6,816,158 B1* | 11/2004 | Lemelson et al. | 345/419 |
| 7,518,793 B2* | 4/2009 | Mashitani et al. | 359/464 |
| 2009/0058845 A1* | 3/2009 | Fukuda et al. | 345/214 |
| 2010/0007582 A1* | 1/2010 | Zalewski | 345/8 |
| 2010/0027113 A1* | 2/2010 | Shin et al. | 359/463 |
| 2010/0195190 A1* | 8/2010 | Ishioka et al. | 359/316 |
| 2012/0242651 A1* | 9/2012 | Liu et al. | 345/419 |
| 2012/0249537 A1* | 10/2012 | Bae et al. | 345/419 |
| 2013/0155051 A1* | 6/2013 | Shimoyama et al. | 345/419 |

FOREIGN PATENT DOCUMENTS

| | | |
|---|---|---|
| EP | 1 750 459 | 2/2007 |
| GB | 2 398 130 | 8/2004 |

OTHER PUBLICATIONS

Extended European Search Report issued Mar. 12, 2014 in corresponding European Application No. 13170154.2.

* cited by examiner

*Primary Examiner* — Victor Kostak
(74) *Attorney, Agent, or Firm* — Staas & Halsey LLP

(57) ABSTRACT

A multi viewer display and a displaying method of the same enables a plurality of viewers to view different images. The multi viewer display includes a display unit which includes a plurality of pixels, an image receiver which receives a plurality of image signals, a signal processor which processes the plurality of image signals to allot and display the plurality of received image signals for each pixel of the display unit corresponding to a plurality of viewers, and an optical angle converter which changes displayed light of the image signal displayed in the pixel of the display unit to be within a viewing angle range of the concerned viewer among the plurality of viewers.

30 Claims, 11 Drawing Sheets

MULTI VIEWER DISPLAY AND DISPLAYING METHOD OF THE SAME

CROSS-REFERENCE TO RELATED APPLICATIONS

This application claims priority from Korean Patent Application No. 10-2012-0107125, filed on Sep. 26, 2012 in the Korean Intellectual Property Office, the disclosure of which is incorporated herein by reference.

BACKGROUND

1. Field

One or more embodiments relate to a multi viewer display and a displaying method of the same, and more particularly, to a multi viewer display and a displaying method of the same which enables a plurality of viewers to view different images in an entire screen through a single display.

2. Description of the Related Art

With the recent development of technology, expensive ultra high definition (UHD) TVs as well as full high definition (FHD) TVs have been launched on the market.

A plurality of viewers may wish to view different images according to their preferences. However, it is not easy for the plurality of viewers to each have an expensive TV.

Currently, the only method for viewing different images through a single TV is to divide a single screen by using, e.g. a picture-in-picture (PIP) function.

The aforementioned method for dividing a single TV for the plurality of viewers is not cost-efficient since the expensive large TV is utilized as a small TV. Further, such method does not satisfy each of the respective viewers due to a smaller screen.

As the plurality of images is displayed in a single screen, viewers may be distracted by other images and may has less enjoyment from his/her viewing.

SUMMARY

Additional aspects and/or advantages of one or more embodiments will be set forth in part in the description which follows and, in part, will be apparent from the description, or may be learned by practice of one or more embodiments of disclosure. One or more embodiments are inclusive of such additional aspects.

Accordingly, one or more exemplary embodiments relate to a multi viewer display and a displaying method of the same which may enable a plurality of viewers to view different images in an entire screen by using a single TV.

One or more exemplary embodiment relate to a multi viewer display and a displaying method of the same which may adjust a viewing angle corresponding to a location of viewers.

The foregoing and/or other aspects may be achieved by providing a multi viewer display which may include a display unit which may include a plurality of pixels, an image receiver which may receive a plurality of image signals, a signal processor which may process the plurality of image signals to allot and display the plurality of received image signals for each pixel of the display unit corresponding to a plurality of viewers, and an optical angle converter which may change displayed light of the image signal displayed in the pixel of the display unit to be within a viewing angle range of the concerned viewer among the plurality of viewers.

The optical angle converter may include a liquid lens including a liquid that changes a photorefractive index according to an applied voltage.

The optical angle converter may include a polarization switch which sequentially converts a polarizing direction of incident light according to an applied voltage.

The voltage applied to the optical angle converter may be applied to pixels of the display unit by row or column.

The optical angle converter may further include a birefringent element which transmits or refracts light in the polarizing direction of the light that has transmitted the polarization switch.

The optical angle converter may further include a lenticular lens corresponding to at least one pixel.

The multi viewer display may further include a viewer location detector which detects a location of the viewer.

The optical angle converter may change the displayed light based on the detected location of the viewer.

The plurality of image signals may be alternately allotted to pixels which are adjacent to the row or column of the pixels of the display unit.

The plurality of image signals in the same row or column may be separately displayed.

The viewing angle range of the viewers may be preset.

The viewing angle range of the plurality of viewers may not overlap one another.

The viewing angle range of the viewers may be set on the basis of the detected location of the viewer.

The multi viewer display may further include a user interface (UI) generator which generates a UI for guiding the location of the viewer according to the set viewing angle range.

Two adjacent pixels may each receive left eye image information and right eye image information with respect to one image signal and display 3D images.

The optical angle converter may receive a uniform voltage to display single image information for a single viewer.

According one or more exemplary embodiments, there is provided a displaying method of a multi viewer display which may include, receiving a plurality of image signals, processing the plurality of image signals to allot and display the plurality of received image signals in each pixel of a display unit corresponding to a plurality of viewers, and changing displayed light of the image signals displayed in the pixel of the display unit to be within a viewing angle range of the concerned viewer among the plurality of viewers.

The displaying method may further include transmitting or refracting the changed displayed light in a polarizing direction.

The displaying method may further include detecting a location of the viewer.

The changing step may be performed on the basis of the detected location of the viewer.

The processing step may include alternately allotting the plurality of image signals to adjacent pixels in a row or column of the pixels of the display unit.

The plurality of image signals in the same row or column may be separately displayed.

The viewing angle range of the viewers may be preset.

The viewing angle range of the plurality of viewers may not overlap one another.

The viewing angle range of the viewers may be set on the basis of the detected location of the viewer.

The displaying method may further include a user interface (UI) generator which generates a UI for guiding the location of the viewer according to the set viewing angle range.

The displaying method may further include a user interface (UI) generator which generates a UI for guiding the location of the viewer according to the set viewing angle range.

Two adjacent pixels may each receive left eye image information and right eye image information with respect to one image signal and display 3D images.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
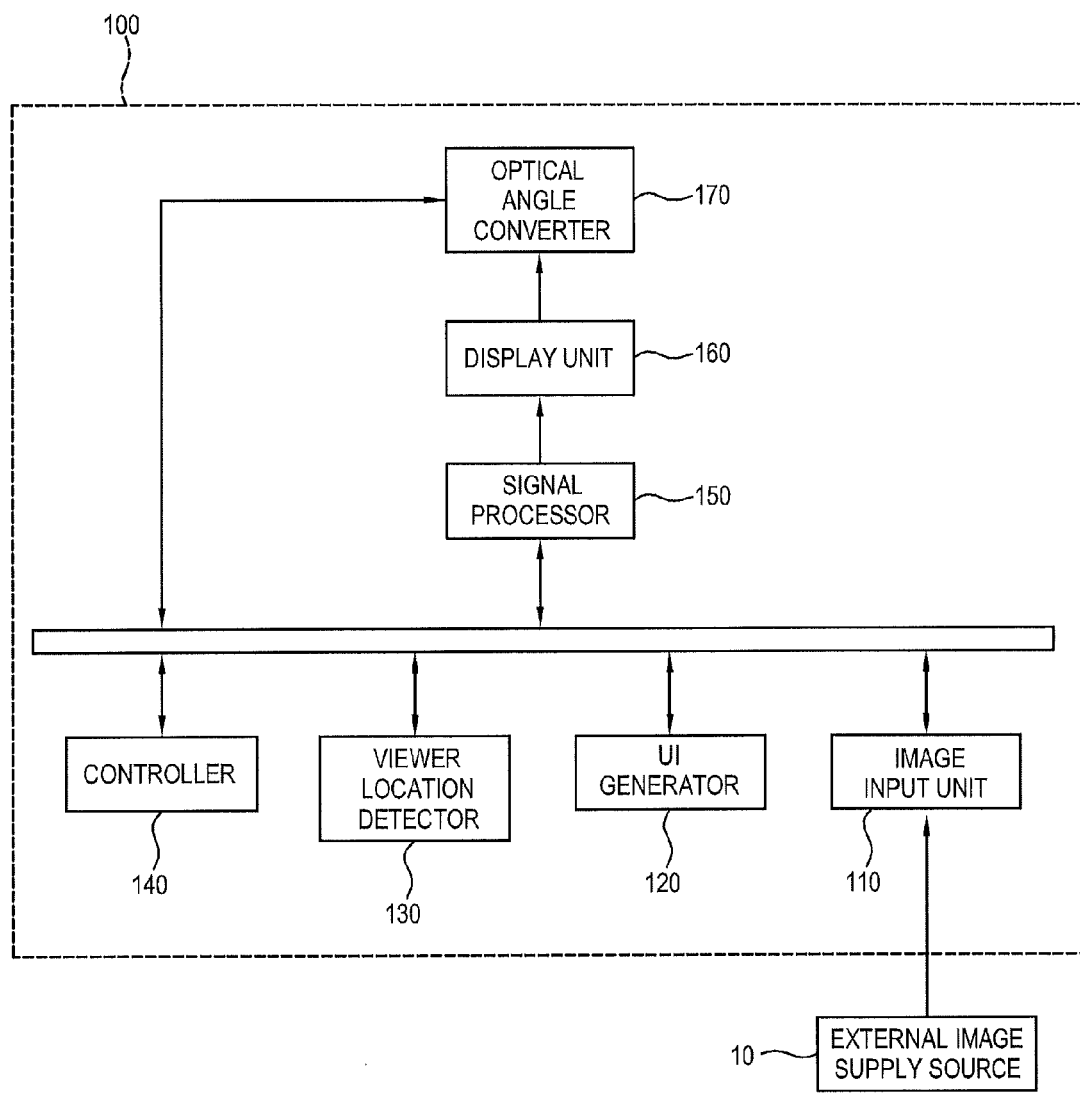
FIG. 1 is a block diagram of a multi viewer display according to one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein, as various changes, modifications, and equivalents of the systems, apparatuses and/or methods described herein will be understood to be included in the invention by those of ordinary skill in the art after embodiments discussed herein are understood. Accordingly, embodiments are merely described below, by referring to the figures, to explain aspects of the present invention.

Hereinafter, a display according to one or more embodiments will be described in detail with reference to accompanying drawings.

As shown in FIG. 1, a display apparatus 100 according to one or more embodiments may include an image input unit 110 which may receive at least one image signal from an external image supply source 10, a user interface (UI) generator 120 which may generate a UI/graphic based on the input image signal, a viewer location detector 130 which may detect a location of a user in front of the display apparatus 100, a controller 140 which may perform overall control operations of the display apparatus 100, a signal processor 150 which may process the input image signal, a display unit 160 which may display the processed image signal thereon, and an optical angle converter 170 which may change an angle of displayed light that is displayed and emitted by the display unit 160.

The external image supply source 10 may include, for example, a broadcasting station supplying a broadcasting signal, a cable broadcasting provider supplying image signal by cable, a server connected to the Internet, an external storage device such as a universal serial bus (USB) memory stick, or a computer, a personal digital assistant (PDA), a smart phone, or a TV which include a plurality of contents.

The image input unit 110 may include a wired/wireless communication unit which may receive a broadcasting signal from the outside through, for example, an antenna, a tuner to select and receive at least one image signal, and an interface which may transmit and receive an image signal according to standards such as high definition multimedia interface (HDMI), USB, Component and LVDS. The image input unit 110 may simultaneously or sequentially receive a plurality of images.

The wired/wireless communication unit may include, for example, a local area network (LAN), Wi-Fi, Bluetooth, near field communication (NFC), etc. to communicate with a PC or mobile device.

The UI generator 120 may generate a UI for displaying the UI on the display unit 160 according to a command input through a user input unit (not shown) such as a wireless keyboard, a wireless mouse, etc. as well as a remote controller.

The viewer location detector 130 may detect a viewer's location to display an image to be shown properly from the viewer's location. The viewer location detector 130 may include, for example, a motion detector, a location detector, heat detector, etc. The viewer location detector 130 may be provided, for example, in an upper side or a central lower side of a chassis possibly forming an external appearance of the display unit 160.

The controller 140 may include, e.g., a central processing unit (CPU), and may control various elements of the display apparatus 100. For example, the controller 140 may control the signal processor 150 to process a signal, control the image input unit 110 to transmit and receive signals/information/data, perform a control operation in response to a command from the user input unit (not shown), and control the optical angle converter 170 to thereby control overall operations of the display apparatus 100.

The signal processor 150 may perform various signal processing operations with respect to a received image/video signal. The signal processor 150 may output the processed image/voice signal to the display unit 160 and a speaker (not shown), and an image/voice may be displayed on or output through the display unit 160 or the speaker based on the image/voice signal.

The signal processor 150 may include a mixer to overlay subtitle data on image data or mix the subtitle data and the image data, or mix voice and image; a demultiplexer which may de-multiplex, i.e. may divide a predetermined signal into signals by nature; a decoder which may decode an image signal corresponding to its image format; a deinterlacer which may deinterlace, i.e., may convert an interlace image signal into a progressive image signal; a scaler which may scale an image signal into a preset resolution; a noise buster which may reduce noise from an image signal to improve a picture quality; a detailer which may enhance details of an image; and an image adjuster which may perform a frame rate conversion (FRC), 2D/3D conversion and mute adjustment to adjust data into a proper form to be displayed on the display unit 160, e.g., may convert a frame rate of image data and may express fast motion, which may perform various process to the image/voice signal.

The signal processor 120 may be implemented, for example, as an image processing board (not shown) which may be formed by installing various chipsets (not shown), memory (not shown), electronic parts (not shown), wirings (not shown), etc. on a printed circuit board (PCB) (not shown), to thereby process an input image signal.

Figure 2:
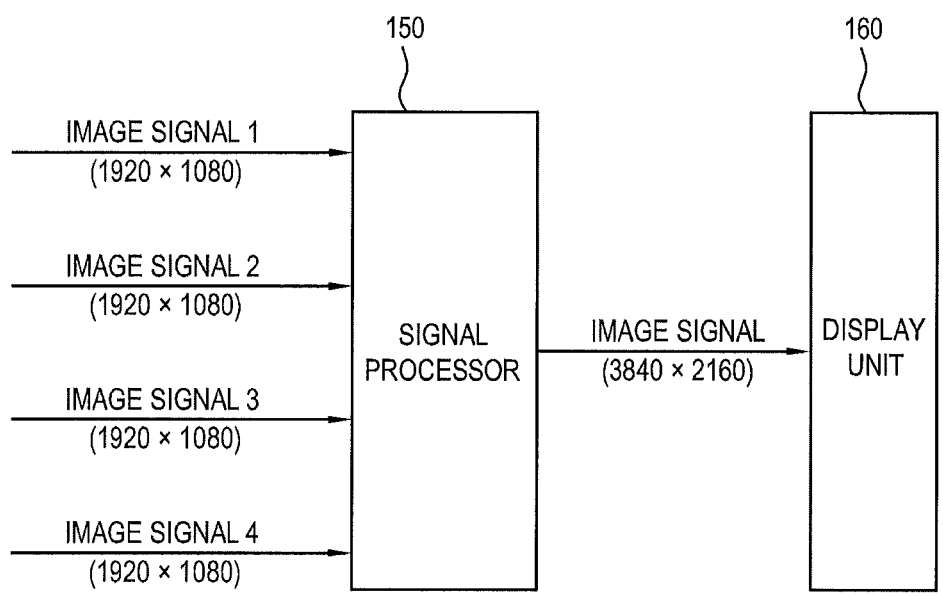
FIG. 2 is a block diagram showing a process of receiving and processing a plurality of image signals according to one or more embodiments.

As shown in FIG. 2, the signal processor 120 may process, e.g. four image signals (1920×1080) input through the image input unit 110, may combine the four images into one image signal (3840×2160), and may display the combined image signal on the display unit 160.

Figure 3:
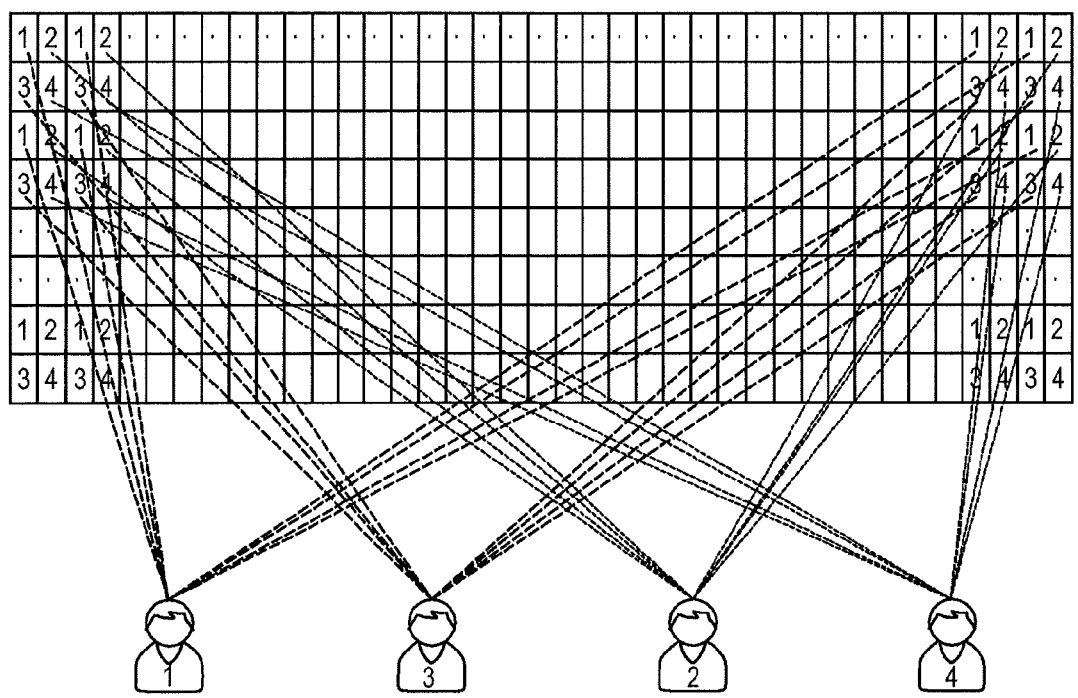
FIG. 3 illustrates allotting and displaying a plurality of image signals in a single screen according to one or more embodiments.

The one image signal (3840×2160) into which the four image signals (1920×1080) are combined may be allotted to respective pixels of the display unit 160 as shown in FIGS. 2-5. That is, image signals 1 and 2 may be alternately allotted to a pixel 162 in odd rows, and image signals 3 and 4 may be alternately allotted to a pixel 164 in even rows. Preferably, the image signal which is allotted to the adjacent pixel 162 in the same row may be an image signal for viewers who are far from each other. For example, as shown in FIG. 3, a viewer 3 may be located between a viewer 1 and a viewer 2 so that the image signals 1 and 2 allotted to the pixel 162 in the odd rows may be viewed by the viewers 1 and 2 by minimizing interference of the image signals 1 and 2. This also applies to the allotment of the image signal to the same column.

The four allotted image signals 1 to 4 are displayed in the pixels 162 and 164 of the display unit 160 and may be changed to be within the viewing angle range of viewers through the optical angle converter 170 so that the four viewers may simultaneously view the image signals from different locations, respectively.

As shown in FIG. 3, the viewing location of viewers may be set differently in advance. Also, the viewing angle range of the plurality of viewers may not overlap one another since otherwise different image signals in adjacent pixels are shown and may affect an image quality.

The viewing location of the viewers may be set on the basis of the location detected by the viewer location detector 130.

The display unit 160 may display an image thereon based on an image signal output by the signal processor 150. The display type of the display unit 160 may include, for example, but is not limited to, a liquid crystal display (LCD), a plasma display panel (PDP), a light-emitting diode (LED), an organic light emitting diode (OLED), a surface-conduction electron-emitter, a carbon nano-tube, nano-crystal, etc.

The display unit 160 may further include additional elements depending on its embodiment type. For example, the display unit 160 as LCD may include an LCD panel (not shown), a backlight unit (not shown) emitting light to the LCD panel, a color filter (not shown), a polarizing plate (not shown), and a panel driving substrate (not shown) driving the LCD panel.

The display unit 160 may include a plurality of pixels 162 and 164. The respective pixels 162 and 164 may express predetermined brightness and colors according to the allotted image signal.

Figure 4:
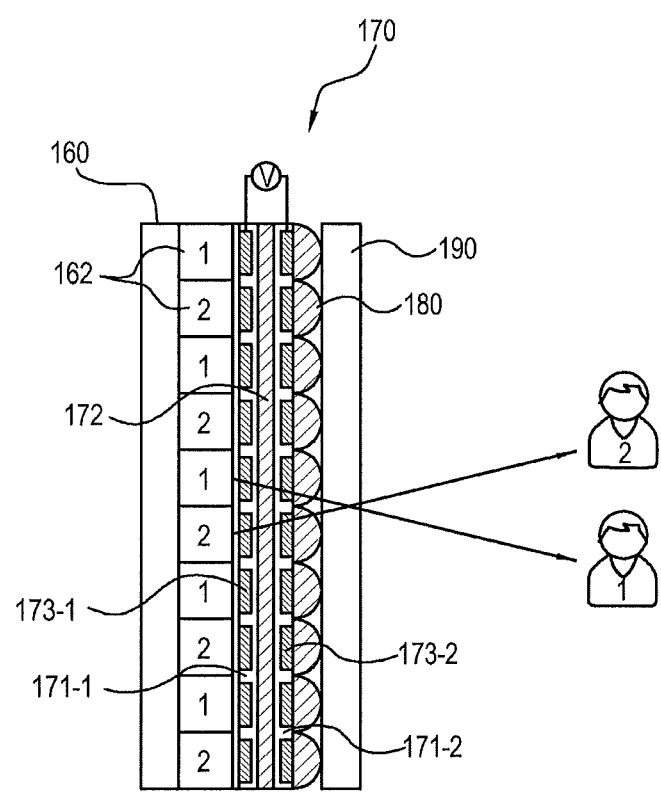
FIGS. 4 and 5 are partial enlarged views of a display unit of the multi viewer display according to one or more embodiments.

As shown in FIG. 4, the optical angle converter 170 may be provided in front of the display unit 160 with respect to the respective pixels 162 and 164, and may change a refractive index of a displayed light displayed in the pixels 162 and 164 of the display unit 160 to be within the viewing angle range of viewers. The viewing angle range of the viewers may be set in advance depending on the number of viewers, and may be set on the basis of the viewer's location detected by the viewer location detector 130.

The optical angle converter 170 may include a liquid lens including a liquid 172 that changes a photorefractive index according to an applied voltage. The liquid lens may be formed by arranging transparent electrodes 173-1 and 173-2 in two substrates 171-1 and 171-2 and injecting the liquid 172 including water and oil between the two substrates 171-1 and 171-2 and by applying a voltage V between the respective transparent electrodes 173-1 and 173-2 to thereby change the refractive index of transmitted light. That is, the liquid lens may change the refractive angle of the lens depending on the intensity of the applied voltage. The voltage that is applied to the liquid lens corresponding to each pixel may be synchronized with the image signal allotted to the pixel. The optical angle converter 170 may be controlled by the controller 140.

The optical angle converter 170 may apply a uniform voltage to all pixels when a single image signal is displayed for a single viewer.

For example, the optical angle converter 170 may be implemented as a polarization switch that selectively supplies power to each pixel to change a polarizing direction of incident light. Of course, in addition to the aforementioned liquid lens and polarization switch, any lens that can apply voltage to change the refractive index of light may be used.

The optical angle converter 170 may further include a semicircular or semicylindric lenticular lens 180 which is provided in front of the liquid lens. The lenticular lens 180 properly divides displayed light of an image signal transmitted to adjacent viewers. That is, the lenticular lens 180 may make a viewing angle narrower for only the concerned viewer to view the image signal.

The optical angle converter 170 may further include a birefringent element 190 whose refractive index varies by the polarizing direction and which may be provided in front of the liquid lens or the lenticular lens 180. That is, normal light that has a polarizing direction in parallel with the crystal optic axis of the birefringent element 190 may be transmitted according to a normal refractive index of the birefringent element 190 while abnormal light that has a polarizing direction perpendicular to the crystal optic axis of the birefringent element 190 may be refracted according to the abnormal refractive index of the birefringent element 190. Accordingly, P-polarized light and S-polarized light may be refracted at different angles when transmitting the birefringent element 190. The birefringent element 190 may include, for example, calcite or nematic liquid crystal.

Figure 5:
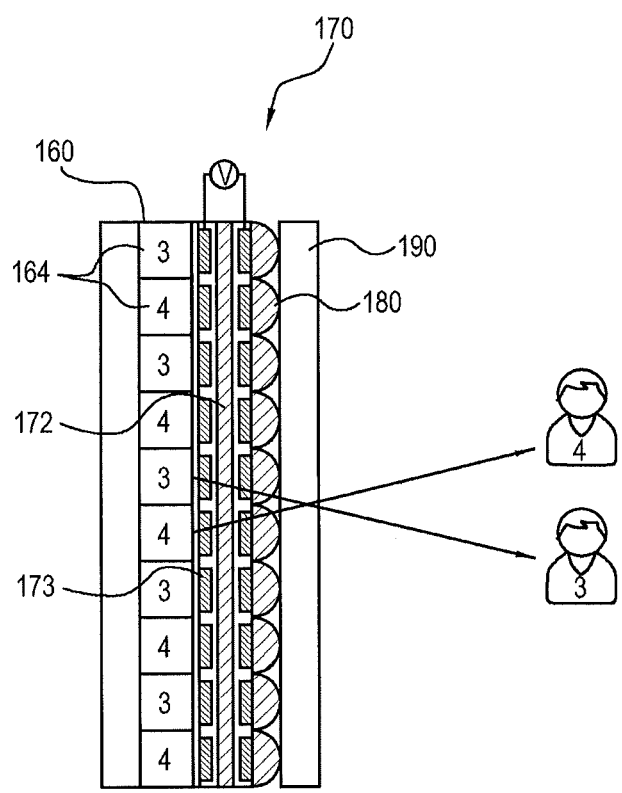

For example, if four viewers desire to view multi views, image signals 1 and 2 may be allotted to and displayed in pixels in odd rows for viewers 1 and 2, and image signals 3 and 4 may be allotted to and displayed in pixels in even rows for viewers 3 and 4 as shown in FIGS. 4 and 5. The optical angle converter 170 may apply different voltages to all pixels of the display unit 160 for each image signal with respect to a plurality of viewers to vary the refractive angle. However, the plurality of viewers normally stand in front of the display apparatus 100 in a horizontal direction, and thus the viewing angle in the horizontal direction may be adjusted for the plurality of viewers to view different images.

Figure 6:
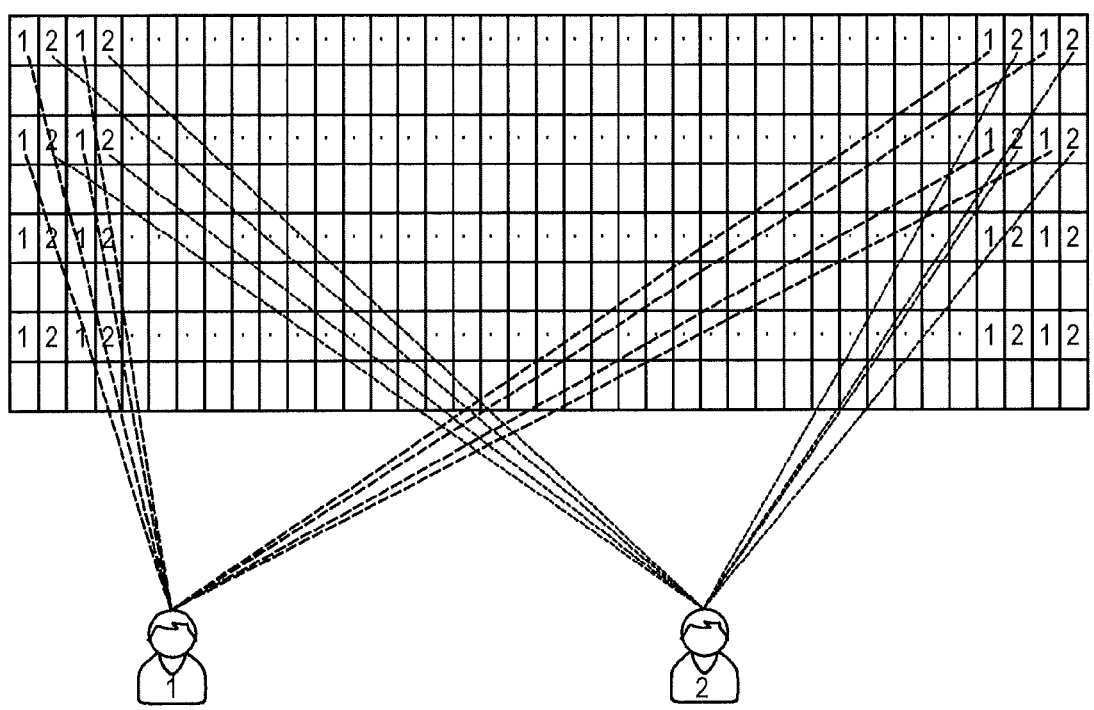
FIGS. 6 and 7 illustrate separating and displaying image signals in an odd row and even row of a display unit according to one or more embodiments, as in FIG. 3.
Figure 7:
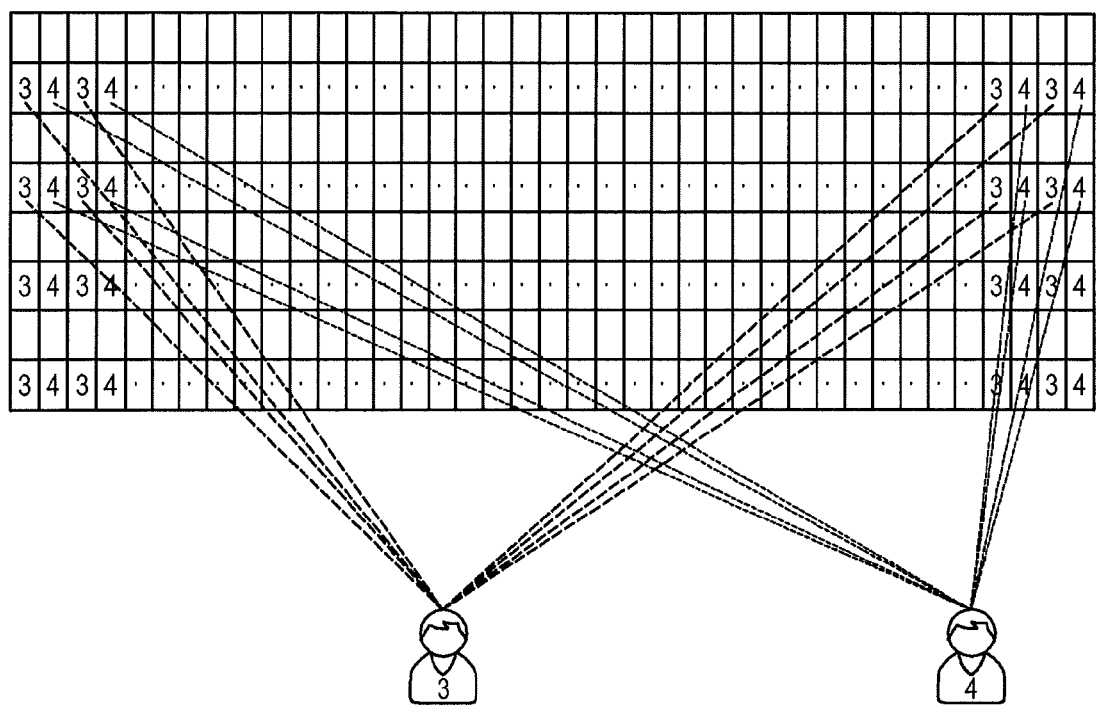

As shown in FIGS. 3 to 5, the optical angle converter 170 may control each pixel to change each of the displayed light with respect to all of four viewers to be within the viewing angle range. Accordingly, as shown in FIGS. 6 and 7, each image signal may be divided for odd rows and even rows and image frames may be divided and sequentially displayed. That is, as shown in FIG. 6, an image signal may be displayed in a single image frame for viewers 1 and 2 who view the odd rows, and then as shown in FIG. 7, another image signal may be displayed in another image frame for viewers 3 and 4 who view the even rows.

If the image signal is divided and displayed for the plurality of viewers as described above, the voltage applied to the pixels of the optical angle converter 170 may be controlled for each column or row. In particular, in the case of the viewing angle range for the plurality of viewers, horizontal viewing angle may be more important than vertical viewing angle, and controlling pixels per column rather than per row may be preferable. In particular, controlling voltages to the pixels per column or row may facilitate a more convenient manufacturing of the transparent electrodes 171-1 and 171-2 of the optical angle converter 170 and the lenticular lens 180. That is, rather than dot-type electrodes and lens for each pixel, stripe-type electrodes and lens may be formed.

Figure 8:
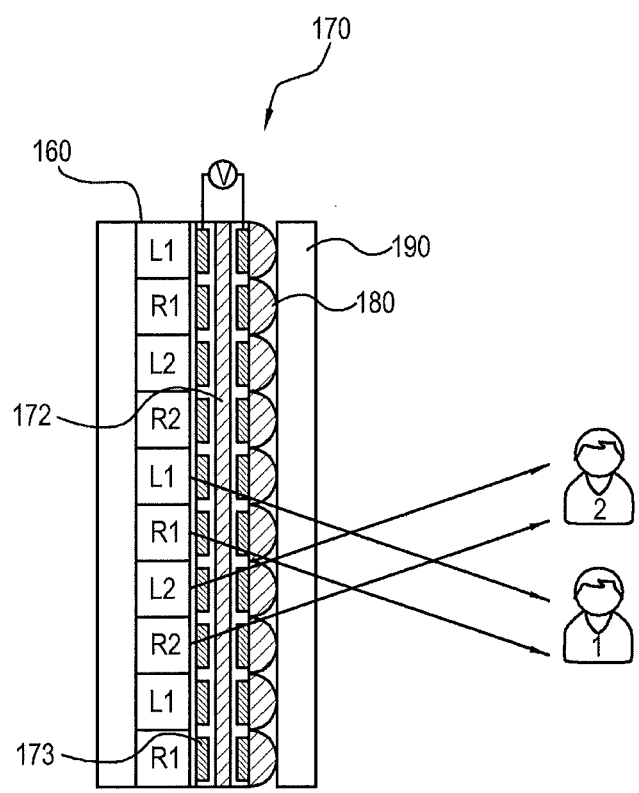
FIG. 8 is a partial enlarged view of a display unit of a multi viewer display according to one or more embodiments.

FIG. 8 illustrates a display unit 160 and an optical angle converter 170 of a multi viewer display 100 according to one or more embodiments. As shown therein, a left eye image signal L1 and a right eye image signal R1, and a left eye image signal L2 and a right eye image signal R2 may be alternately allotted to pixels. The left eye image signal L1 and the right eye image signal R1 and the left eye image signal L2 and the right eye image signal R2 may be changed to be within the viewing angle range of viewers 1 and 2 through the optical angle converter 170, and such changed displayed light may be divided into the left eye image signal L1 and the right eye image signal R1, and the left eye image signal L2 and the right eye image signal R2 by the lenticular lens 180. The divided left eye image signal L1, right eye image signal R1, left eye image signal L2 and right eye image signal R2 may be changed to be within the viewing angle range of a plurality of viewers and may be viewed by the concerned viewers only. The divided left eye image signal L1, right eye image signal R1, left eye image signal L2 and right eye image signal R2 may be sequentially displayed and thus a plurality of viewers individually viewing the plurality of image signals at different viewing angles may view 3D images rather than 2D images.

Hereinafter, a displaying method of the multi viewer display 100 according to one or more embodiments will be described in detail with reference to FIGS. 9 to 11.

Figure 9:
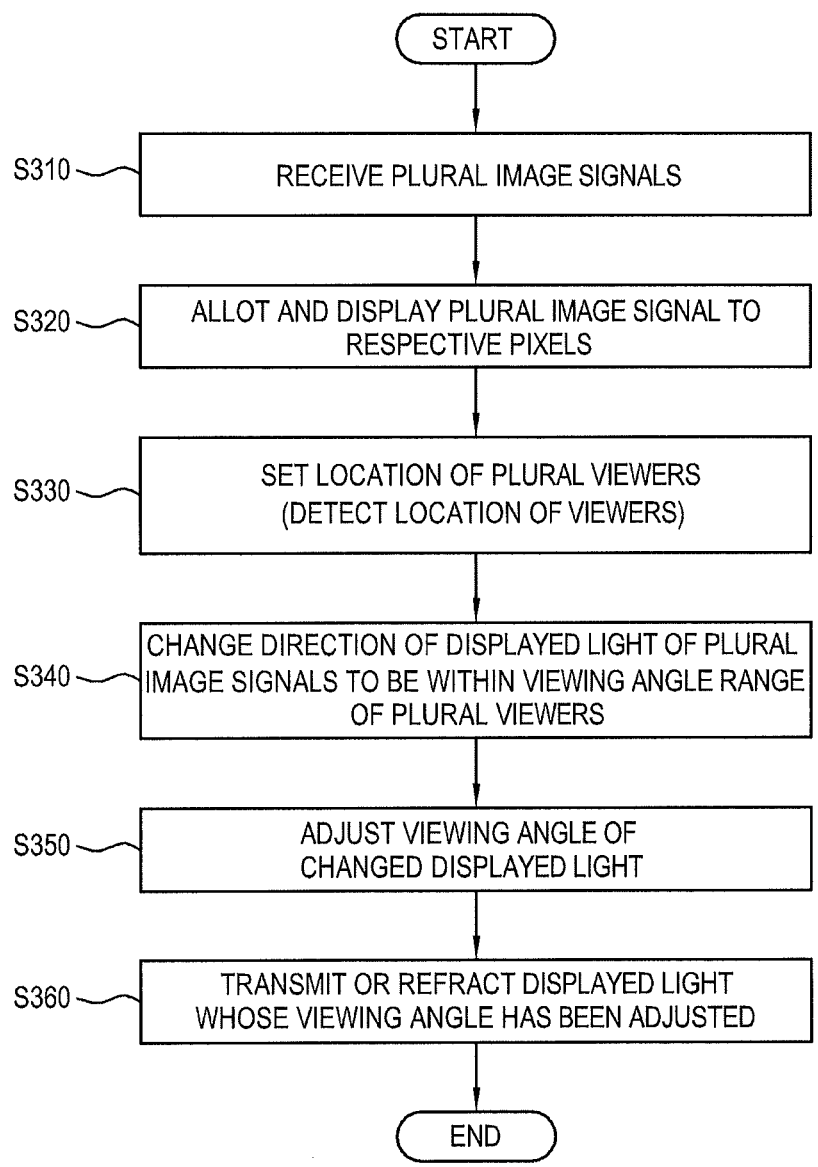
FIG. 9 is a flowchart showing a multi viewer displaying method according to one or more embodiments.

As shown in FIG. 9, the display 100 may receive a plurality of image signals from the external image supply source 10 through the image input unit 110 (S310). The plurality of received image signals may be allotted to and displayed in the respective pixels of the display unit 160 by the signal processor 150 (S320). The location of the plurality of viewers may be set in advance, or detected through the viewer location detector 130 depending on the number of viewers (S330).

The controller 140 may control the optical angle converter 170 to change the displayed light of the respective image signals displayed in the pixels to be within the viewing angle range of the respective viewers taking into account the preset location of the viewers or the detected location of the viewers (S340).

The changed displayed light of the respective image signals may be more accurately adjusted, in terms of viewing angle, by the lenticular lens 180 to thereby possibly reduce interference among adjacent viewers (S350).

Finally, the displayed light whose viewing angle has been adjusted may transmit or be refracted by the birefringent element 190 to form a viewing angle in a more limited range for the concerned viewer (S360).

Figure 10:
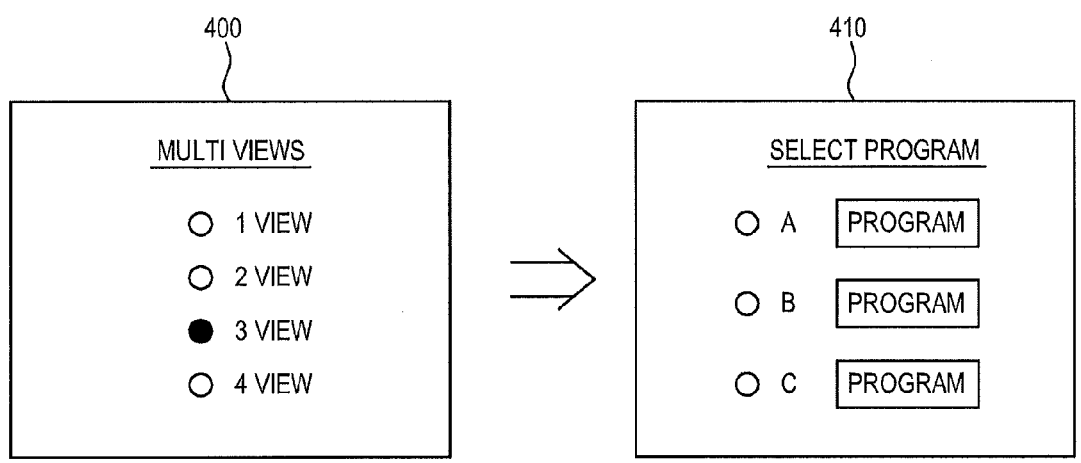
FIG. 10 illustrates a user interface (UI) according to one or more embodiments.
Figure 11:
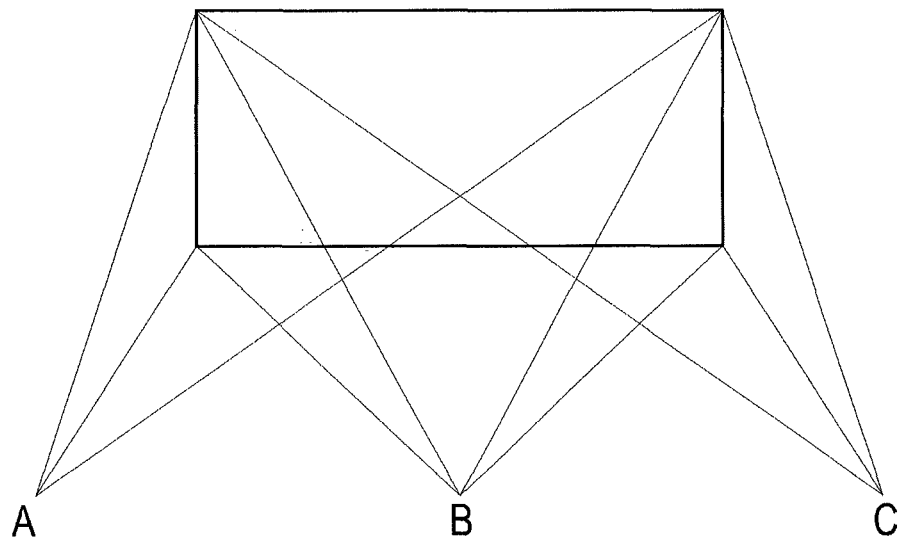
FIG. 11 illustrates guidance provided in a UI when 3 multi viewers are selected according to one or more embodiments, such as the UI in FIG. 10.

As described above, in the multi viewer display 100 according to the embodiment, if a user presses a multi view button through a user input device (not shown) such as a remote controller, the UI generator 120 may generate a UI 400 as in FIG. 10 and display the UI 400 on the display unit 160. If a viewer selects 3 multi viewers, a next UI 410 may be generated for the viewers to select programs for the three viewers A, B and C. If the selection of the programs for the viewers A, B and C is completed, as shown in FIG. 11, a guiding interface 500 may be displayed to notify the location of the viewers.

If one more viewer is added or omitted while three viewers view multi views, the condition for the multi views may be amended.

According to one or more embodiments, a plurality of viewers may view different images in an entire screen through a single TV and may be satisfied simultaneously.

In one or more embodiments, any apparatus, system, element, or interpretable unit descriptions herein include one or more hardware devices or hardware processing elements. For example, in one or more embodiments, any described apparatus, system, element, retriever, pre or post-processing elements, tracker, detector, encoder, decoder, etc., may further include one or more memories and/or processing elements, and any hardware input/output transmission devices, or represent operating portions/aspects of one or more respective processing elements or devices. Further, the term apparatus should be considered synonymous with elements of a physical system, not limited to a single device or enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be any defined, measurable, and tangible distributed network, so that the computer readable code is stored and executed in a distributed fashion. Still further, as only an example, the processing element could include a processor or a computer processor, and processing elements may be distributed and/or included in a single device.

The computer-readable media may also be embodied in at least one application specific integrated circuit (ASIC) or Field Programmable Gate Array (FPGA), as only examples, which execute (e.g., processes like a processor) program instructions.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A multi viewer display comprising:
   a display unit comprising a plurality of pixels;
   an image receiver which receives a plurality of image signals;
   a signal processor which processes the plurality of image signals to allot and display the plurality of received image signals for each pixel of the display unit corresponding to a plurality of viewers; and
   an optical angle converter which changes displayed light of the image signal displayed in each pixel of the display unit to be within a viewing angle range of each respective viewer among the plurality of viewers by changing a refraction of the displayed light.

2. The multi viewer display according to claim 1, wherein the optical angle converter comprises a liquid lens comprising a liquid that changes a photorefractive index according to an applied voltage.

3. The multi viewer display according to claim 1, wherein the optical angle converter comprises a polarization switch which sequentially converts a polarizing direction of incident light according to an applied voltage.

4. The multi viewer display according to claim 2, wherein the voltage applied to the optical angle converter is applied to pixels of the display unit by row or column.

5. The multi viewer display according to claim 3, wherein the voltage applied to the optical angle converter is applied to pixels of the display unit by row or column.

6. The multi viewer display according to claim 3, wherein the optical angle converter further comprises a birefringent element which transmits or refracts light in the polarizing direction of the light that has transmitted the polarization switch.

7. The multi viewer display according to claim 1, wherein the optical angle converter further comprises a lenticular lens corresponding to at least one pixel.

8. The multi viewer display according to claim 1, further comprising a viewer location detector which detects a location of the viewer.

9. The multi viewer display according to claim 8, wherein the optical angle converter changes the displayed light based on the detected location of the viewer.

10. The multi viewer display according to claim 1, wherein the plurality of image signals is allotted to alternating rows or columns of the pixels of the display unit.

11. The multi viewer display according to claim 10, wherein the plurality of image signals in the same row or column is separately displayed.

12. The multi viewer display according to claim 1, wherein the viewing angle range of the viewers is preset.

13. The multi viewer display according to claim 1, wherein the viewing angle range of the plurality of viewers does not overlap one another.

14. The multi viewer display according to claim 8, wherein the viewing angle range of the viewers is set on the basis of the detected location of the viewer.

15. The multi viewer display according to claim 12, further comprising a user interface (UI) generator which generates a UI for guiding the location of the viewer according to the set viewing angle range.

16. The multi viewer display according to claim 14, further comprising a user interface (UI) generator which generates a UI for guiding the location of the viewer according to the set viewing angle range.

17. The multi viewer display according to claim 1, wherein two adjacent pixels receive left eye image information and right eye image information with respect to one 3D image signal.

18. The multi viewer display according to claim 2, wherein the optical angle converter receives a uniform voltage to display single image information for a single viewer.

19. A displaying method of a multi viewer display comprising:
   receiving a plurality of image signals;
   processing the plurality of image signals to allot and display the plurality of received image signals in each pixel of a display unit corresponding to a plurality of viewers; and
   changing displayed light of the image signals displayed in each pixel of the display unit to be within a viewing angle range of each respective viewer among the plurality of viewers by changing a refraction of the displayed light.

20. The displaying method according to claim 19, further comprising transmitting or refracting the changed displayed light in a polarizing direction.

21. The displaying method according to claim 19, further comprising detecting a location of the viewer.

22. The displaying method according to claim 21, wherein the changing is performed on the basis of the detected location of the viewer.

23. The displaying method according to claim 19, wherein the processing comprises allotting the plurality of image signals to alternating rows or columns of the pixels of the display unit.

24. The displaying method according to claim 23, wherein the plurality of image signals in the same row or column is separately displayed.

25. The displaying method according to claim 19, wherein the viewing angle range of the viewers is preset.

26. The displaying method according to claim 19, wherein the viewing angle range of the plurality of viewers does not overlap one another.

27. The displaying method according to claim 21, wherein the viewing angle range of the viewers is set on the basis of the detected location of the viewer.

28. The displaying method according to claim 25, further comprising a user interface (UI) generator which generates a UI for guiding the location of the viewer according to the set viewing angle range.

29. The displaying method according to claim 27, further comprising a user interface (UI) generator which generates a UI for guiding the location of the viewer according to the set viewing angle range.

30. The displaying method according to claim 19, wherein two adjacent pixels receive left eye image information and right eye image information with respect to one 3D image signal.

* * * * *